W. D. McCORMACK.
CUSHION TIRE.
APPLICATION FILED JAN. 22, 1912.

1,042,941.

Patented Oct. 29, 1912.

WITNESSES

INVENTOR

ATTORNEYS

UNITED STATES PATENT OFFICE.

WILLIAM D. McCORMACK, OF NASHVILLE, TENNESSEE.

CUSHION-TIRE.

1,042,941.

Specification of Letters Patent.  Patented Oct. 29, 1912.

Application filed January 22, 1912. Serial No. 672,944.

*To all whom it may concern:*

Be it known that I, WILLIAM D. McCOR-MACK, a citizen of the United States, residing at Nashville, in the county of Davidson and State of Tennessee, have invented certain new and useful Improvements in Cushion-Tires; and I do hereby declare the following to be a full, clear, and exact description of the invention, such as will enable others skilled in the art to which it appertains to make and use the same.

This invention relates to rubber tires for wheels in general, but especially for automobile wheels, and has for its object to produce a tire of the cushion type which does not have to be inflated, and yet will be efficient in action and comparatively inexpensive to construct.

With these objects in view, the invention consists in the novel details of construction and combinations of parts more fully hereinafter described and particularly pointed out in the claim.

Figure 1:
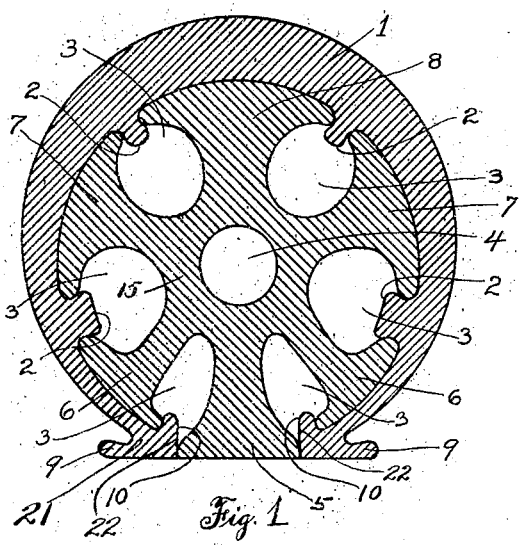
Figure 2:
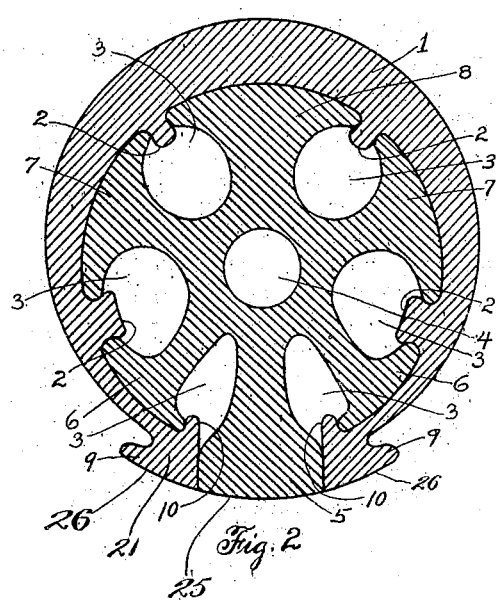
Figure 3:
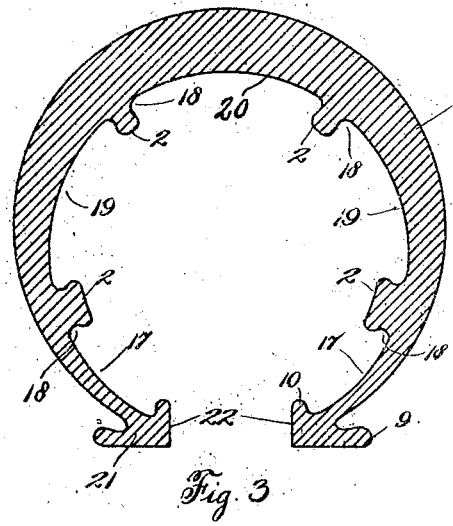
Figure 4:
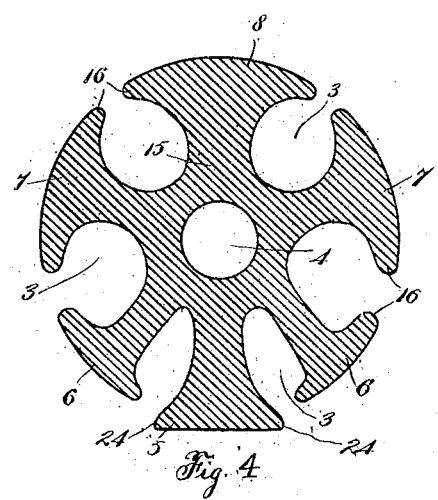

Referring to the accompanying drawings forming a part of this specification in which like numerals designate like parts in all the views:—Figure 1 is a cross sectional view showing my tire removed from the wheel rim; Fig. 2 is a view similar to Fig. 1, but illustrating a slightly modified form of construction; Fig. 3 is a view of the outside casing of the tire detached from the core; and, Fig. 4 is a view of the core detached from the casing.

1 indicates an outside casing or shoe made of any suitable material, but preferably of rubber, or cloth and rubber, which is divided annularly and provided with the inwardly extending locking ridges or ribs 2, located around the inner circumference of said casing and those nearest the wheel rim being preferably of a larger size than those nearest the tread, as shown. The adjacent faces of the divided portion are relatively wide, and are disposed in vertical parallel relation.

The core 15 of my tire is provided with a plurality of annular chambers or radial orifices 3 extending to its outer surface where they form constricted openings and also with an opening 4 passing through the center thereof. Between the openings 3 are located the elongated T-shaped members 5, 6, 7 and 8. The member 5, being slightly longer than the other members, is adapted to fit between and have tight frictional engagement with the opposite faces of the casing divided portion, and the base of said portion 5 rests upon the wheel rim, not shown. The members 7 are preferably larger than the members 6, and the member 8 is larger than the said members 7, as indicated. Each of the members 6, 7 and 8 are preferably curved on their outer ends, and provided with rounded edges 16, as shown. The outer casing 1 is further provided with the circumferentially extending flanges or beads 9 adapted to engage the clencher rim, and with the inner beads 10 adapted to interlock with one of the curved edges 16 of each of the members 6. The said members 6 are further adapted to fit the recesses 17 on the interior of the casing 1, and each of their other edges 16 is adapted to interlock with the curved recesses 18 with which the bosses 2 are provided. In the same way, the curved surfaces of the members 7 fit the recesses 19 on the interior of the casing 1, and the curved surface of the member 8 fits the recess 20 of said casing, the rounded edges 16 of each of said members fitting the corresponding curved recesses 18 of those bosses 2 with which they interlock. The extreme edges 21 of the casing 1 is provided with the straight surface 22, in order that the edges 24 of the member 5 may readily play up and down between said surfaces 22.

The form shown in Fig. 2 is in all respects similar to the form shown in Fig. 1, except the surface 25 of the member 5, and the surfaces 26 of the extreme edges 21 of the casing are curved instead of straight, as is the case in Fig. 1. The object of curving these parts is to adapt the tire to the correspondingly curved surfaces of certain well known forms of clencher rims.

It will be observed that since no portion of my tire is inflated, a puncture through the casing or core does not interfere with its operation, while the rubber core 15 and its orifices or cavities 3 and 4 supply all of the cushioning effects that may be desired.

It is obvious that those skilled in the art may vary the details of construction as well as the arrangement of parts without departing from the spirit of my invention, and therefore, I do not wish to be limited to the above disclosure except as may be required by the claim.

What I claim is:—

In a cushion tire, the combination of a casing or shoe divided circumferentially and having the adjacent walls of the divided portion relatively wide and disposed in vertical and parallel relation; said casing having a plurality of inward and radially disposed ribs formed integral with the body thereof; and a filler member or core located and closely fitting within said casing and adapted to sustain the same; said core having a central and a plurality of annular recesses formed therein to provide air cushioning chambers, said plurality of recesses located adjacent the core periphery and having each a constricted and annular opening adapted to receive said ribs with tight frictional engagement; and said core having a relatively deep and inwardly disposed portion fitting between and having tight frictional engagement with the adjacent walls of the divided portion of said casing, substantially as described.

In testimony whereof, I affix my signature in presence of two witnesses.

WILLIAM D. McCORMACK.

Witnesses:
M. JONES,
W. L. HUDSON.